United States Patent
Wampler et al.

(10) Patent No.: US 9,550,875 B2
(45) Date of Patent: Jan. 24, 2017

(54) NANOSPIKE HYBRID CARBON BLACK

(71) Applicant: Sid Richardson Carbon, LTD.

(72) Inventors: Wesley Wampler, Hudson Oaks, TX (US); Leszek Nikiel, Fort Worth, TX (US)

(73) Assignee: SID RICHARDSON CARBON, LTD., Fort Worth, TX (US)

( * ) Notice: Subject to any disclaimer, the term of this patent is extended or adjusted under 35 U.S.C. 154(b) by 0 days.

(21) Appl. No.: 14/741,938

(22) Filed: Jun. 17, 2015

(65) Prior Publication Data

US 2015/0368424 A1 Dec. 24, 2015

Related U.S. Application Data

(60) Provisional application No. 62/013,911, filed on Jun. 18, 2014.

(51) Int. Cl.
| | |
|---|---|
| *C09C 1/50* | (2006.01) |
| *C08K 3/04* | (2006.01) |
| *C09C 1/60* | (2006.01) |
| *C09C 1/56* | (2006.01) |

(52) U.S. Cl.
CPC . *C08K 3/04* (2013.01); *C09C 1/56* (2013.01); *C09C 1/60* (2013.01); *C01P 2004/04* (2013.01); *C01P 2004/30* (2013.01); *C01P 2004/50* (2013.01); *C01P 2004/62* (2013.01); *C01P 2004/64* (2013.01)

(58) Field of Classification Search
CPC ............................... C09C 1/50; C01P 2004/30
See application file for complete search history.

(56) References Cited

U.S. PATENT DOCUMENTS

| | | | |
|---|---|---|---|
| 4,995,999 A * | 2/1991 | Nakada | C09C 1/50 252/62.51 R |
| 5,643,670 A | 7/1997 | Chung | |
| 6,333,016 B1 | 12/2001 | Resasco et al. | |
| 6,713,541 B1 | 3/2004 | Hergenrother et al. | |
| 2004/0040637 A1 | 3/2004 | Desilets et al. | |
| 2004/0070009 A1 | 4/2004 | Resasco et al. | |
| 2004/0197638 A1 | 10/2004 | McElrath et al. | |

(Continued)

FOREIGN PATENT DOCUMENTS

| | | |
|---|---|---|
| JP | 2000357419 A | 12/2000 |
| JP | 2001281964 A | 10/2001 |

*Primary Examiner* — Stuart Hendrickson

(74) *Attorney, Agent, or Firm* — Fraser Clemens Martin & Miller LLC; Jacob M. Ward

(57) ABSTRACT

A nanospike hybrid carbon black product includes a plurality of carbon black aggregates. Each of the carbon black aggregates has a surface with a plurality of carbon nanospike formed thereon. The carbon nanospikes may each have a length between about 5 nm and 100 nm, and a width between about 5 nm and about 50 nm. A method for manufacturing the nanospike hybrid carbon black product includes the steps of injecting a primary carbon feedstock into a carbon black reactor, and combusting the carbon feedstock under a predetermined high temperature in the carbon black reactor to form carbon black aggregates. A catalyst is then deposited on surfaces of the carbon black aggregates. A secondary carbon feedstock is injected into the carbon black reactor, and reacted with the catalyst to grow carbon nanospikes on the surfaces of the carbon black aggregates.

5 Claims, 4 Drawing Sheets

(56) References Cited

U.S. PATENT DOCUMENTS

Figure 1:
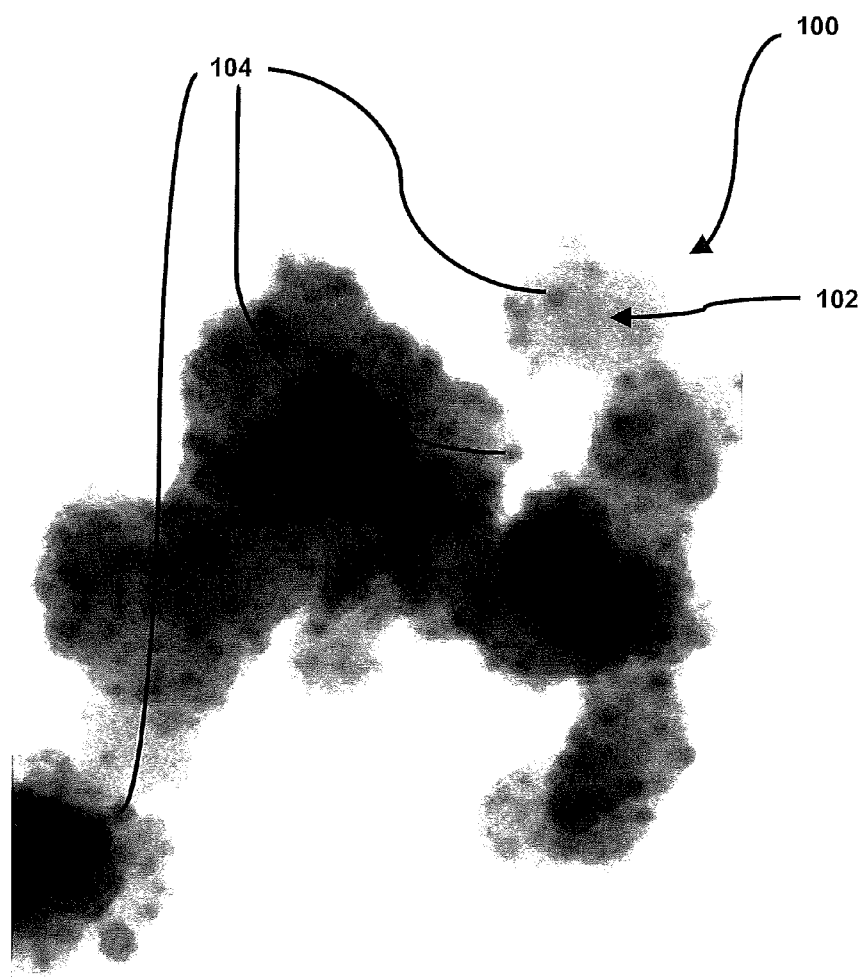

| | | |
|---|---|---|
| 2004/0234841 A1 | 11/2004 | Yoshitake et al. |
| 2005/0025696 A1 | 2/2005 | Resasco et al. |
| 2005/0029498 A1 | 2/2005 | Elkovitch et al. |
| 2005/0064177 A1 | 3/2005 | Lee et al. |
| 2005/0176989 A1 | 8/2005 | Coleman et al. |
| 2006/0111005 A1 | 5/2006 | Geohegan et al. |
| 2006/0116443 A1 | 6/2006 | Probst |
| 2008/0233402 A1 | 9/2008 | Carlson et al. |
| 2009/0293719 A1 | 12/2009 | Pfeffer et al. |
| 2011/0053022 A1 | 3/2011 | Patolsky et al. |
| 2013/0203917 A1 | 8/2013 | Harris et al. |
| 2013/0340651 A1 | 12/2013 | Wampler et al. |
| 2014/0248543 A1 | 9/2014 | Zhu et al. |
| 2014/0293513 A1 | 10/2014 | Eilertsen et al. |

\* cited by examiner

NANOSPIKE HYBRID CARBON BLACK

CROSS-REFERENCE TO RELATED APPLICATIONS

This application claims the benefit of U.S. Provisional Application No. 62/013,911, filed on Jun. 18, 2014. The entire disclosure of the above application is hereby incorporated herein by reference.

FIELD

The present disclosure relates to carbon black products and, more particularly, to a modified carbon black product for rubber and plastic compounds.

BACKGROUND

Carbon black is one of the darkest and most finely divided materials known. Chemically, carbon black is a colloidal form of elemental carbon consisting of 95 to 99 percent carbon. Made in specially designed reactors operating at internal temperatures in the range of 1425° C. to 2000° C., different grades of carbon black can be produced with varying aggregate size and structure.

In making tires and other rubber products, it is desirable to mix carbon black with an elastomer or rubber to improve certain properties of the elastomer. Most of the carbon black used in the tire industry is produced using the furnace process. In the furnace process, the feedstock is incompletely combusted in a reaction to form a very finely divided material composed of aggregates that are the carbon black monounits. These aggregates are typically submicron in size and of very complex structure. The surface of the aggregates may be covered with turbostratic graphitic crystallites and areas of disorganized amorphous carbon.

In order to produce different grades of carbon black, different reactor technology is sometimes employed. In addition to specific reactor design, the number and position of oil spraying nozzles, the ratio of air to feedstock and natural gas, as well as the position of the quench water sprays also plays a critical role in setting the carbon black properties (size, surface area, and structure). When carbon black is formed in the reactor, which takes only a few milliseconds, it is in the form of a thick smoke with apparent density of about $10^{-2}$ g/cm$^3$. The remaining production time, which could be up to two hours, is conveying and handling the product in order to prepare the carbon black to be shipped and further processed.

There is a continuing need for a carbon black product with surface modification that facilitates dispersion in rubber formulations, and which provides superior compression set characteristics in cured rubber products. Desirably, the surface modification of the carbon black product may be performed in situ in a carbon black reactor during the manufacturing of the carbon black product.

SUMMARY

In concordance with the instant disclosure, a carbon black product with surface modification that facilitates dispersion in rubber formulations, and which provides superior compression set characteristics in cured rubber products, and which may be formed in situ in a carbon black reactor during the manufacturing of the carbon black product, is surprisingly discovered.

In one embodiment, a nanospike hybrid carbon black product includes a plurality of carbon black aggregates. Each of the carbon black aggregates has a surface with a plurality of carbon nanospikes formed thereon. The carbon nanospikes may each have a length between about 5 nm and 100 nm, and a width between about 5 nm and about 50 nm.

In another embodiment, a method for manufacturing a nanospike hybrid carbon black includes the steps of providing a carbon black reactor, injecting a primary carbon feedstock into the carbon black reactor, and combusting the carbon feedstock under a predetermined temperature in the carbon black reactor to form carbon black aggregates. A catalyst is then deposited on surfaces of the carbon black aggregates. A secondary carbon feedstock is injected into the carbon black reactor, and reacted with the catalyst to grow carbon nanospikes on the surfaces of the carbon black aggregates.

Rubber formulations and cured rubber products and articles having the nanospike hybrid carbon black product are also disclosed.

DRAWINGS

The above, as well as other advantages of the present disclosure, will become readily apparent to those skilled in the art from the following detailed description, particularly when considered in the light of the drawings and tables described hereafter.

FIG. 1 shows a TEM photograph of the nanospike hybrid carbon black product of the present disclosure, manufactured with a secondary ethylene injection, the photograph showing the presence of nanospikes and the absence of nanotubes on the particle surfaces of the carbon black aggregate;

FIG. 2 shows a TEM photograph of the nanospike hybrid carbon black product according to another embodiment of the disclosure, manufactured with a secondary methane injection, the photograph showing the presence of nanospikes and the absence of nanotubes on the particle surfaces of the carbon black aggregate;

FIG. 3 is a flow diagram depicting a method for manufacturing the nanospike hybrid carbon black of the present disclosure; and FIG. 4 is a schematic diagram of a furnace black system for manufacturing the nanospike hybrid carbon black according to the method depicted in FIG. 3.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical unless otherwise disclosed.

As shown in FIGS. 1-2, the present disclosure includes a modified carbon black known as nanospike hybrid carbon black product 100. The nanospike hybrid carbon black product 100 has a multitude of carbon black aggregates 102. Carbon black is initially formed as roughly spherical primary particles, which, in most cases, rapidly form the aggregates 102. Each of the aggregates is a chain of primary carbon particles that is permanently fused together, for example, in a random branching structure. The carbon black aggregate 102 may consist of just a few, or up to hundreds, of these substantially spherical particles. The chains are open structures and are used to absorb fluids and reinforce materials such as rubber in industry. The carbon black aggregates 102 can also bind together by van der Waals forces in more loosely associated agglomerates, to provide a loose or fluff form of the nanospike hybrid carbon black product 100, or they may be compressed into pellets that are held together by means of binders known in the art such as lignosulfonate, molasses, and oils, as nonlimiting examples, to provide a pelletized form of the nanospike hybrid carbon black product 100.

Two dimensions typically define the size of the carbon black aggregate 102: 1) mean diameter of the component spheres in the chain, which is a measure of the "thickness" of the chain, and is called the primary particle size and is generally inversely proportional to the surface area of the carbon black; and 2) extent of the branched chain aggregate, which is called the aggregate size and is the dimension of the rigid framework that is the aggregate 102. The mean diameter of the carbon black aggregate 102 of the present disclosure is consistent with that of non-modified carbon black produced by oil-furnace processes, and may range from about 15 nm to about 600 nm, for example. The extent of the branched chain in the carbon black aggregate 102 of the present disclosure is consistent with that of non-modified carbon black produced by oil-furnace processes, naturally much larger than the particle components themselves, and typically less than about 2 mm in mean length.

One of ordinary skill in the art of carbon black will understand that the surfaces of the carbon black aggregates 102, formed by the carbon black particles manufactured according to known processes including the oil-furnace process, are generally covered with turbostratic graphitic crystallites and areas of disorganized amorphous carbon.

Each of the carbon black aggregates 102 of the present disclosure further has a plurality of nanospikes 104. As used herein, the term "nanospike" is defined as a node-shaped protrusion formed on the outer layer or surface of a carbon black aggregate 102, and which extends or "spikes" from the surface of the carbon black aggregate 102. Nanospikes 104 are also defined as being different from nanotubes, which are known to have a diameter of close to 1 nm with a tube length that can be many millions of times longer. In contrast, the protrusion forming the nanospike 104 has a length in nanometer dimensions.

In general, the width of the carbon nanospike 104 is less than the diameter of the carbon black particle in the aggregate 102 from which the carbon nanospike 104 extends. However, it should be understood that the height of the carbon nanospike 104 may exceed the diameter of the carbon black particle in some instances.

In a most particular embodiment, substantially all of the carbon nanospikes 104 on the surface of the carbon black have a length between about 5 nm and 100 nm, and a width between about 5 nm and about 50 nm. It should be appreciated that other dimensions for the carbon nanospikes may also be manufactured according to the method described further herein, as desired.

The nanospike hybrid carbon black product 100 of the present disclosure may also have a concentration of a catalyst (not shown). The catalyst is employed, as described further herein, during the formation of the carbon nanospikes 104 on the surfaces of the carbon black aggregates 102 of the nanospike hybrid carbon black product 100.

Figure 3:
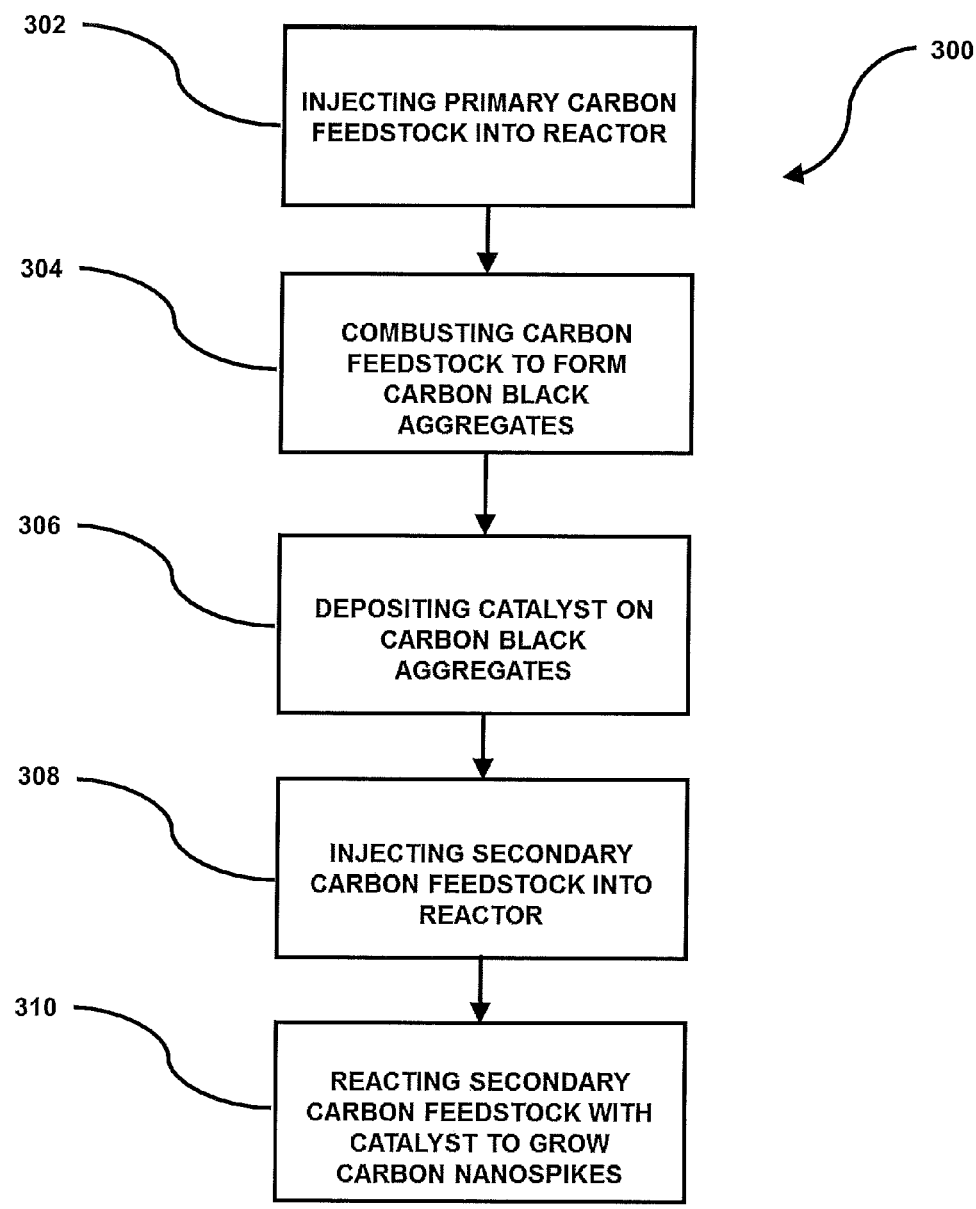

FIG. 3 further shows a method 300 of manufacturing the nanospike hybrid carbon black product 100. The method 300 initially includes a step 302 of injecting a primary carbon feedstock such as an aromatic oil (e.g., based on crude oil) into a carbon black reactor 400 (shown in FIG. 4), and a step 304 of forming the carbon black aggregates 102 in a carbon black reactor 400 by partially combusting or cracking the primary carbon feedstock at high predetermined temperatures. The step of injecting the primary feedstock may include preheating and atomizing the oil in a combustion gas stream that is formed by burning fuel in preheated air.

Figure 4:
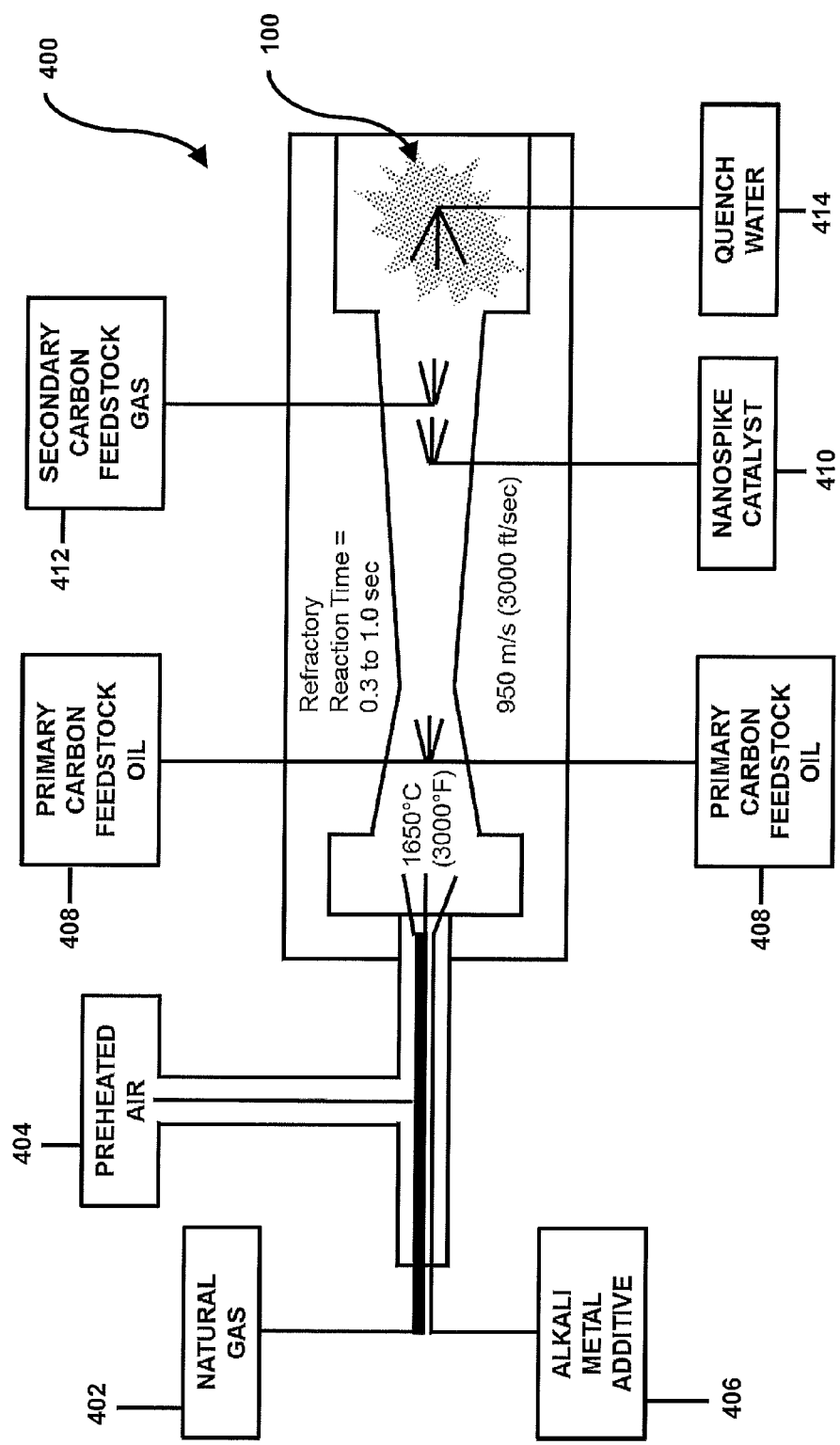

It should be appreciated that any suitable methodology and carbon black reactor 400 known in the art for forming the carbon black aggregates 102 may be used within the scope of the present disclosure. In a most particular embodiment, the oil-furnace black process and the related reactor 400 are employed, for example, as shown in the schematic of FIG. 4, which is described further herein.

With renewed reference to FIG. 3, the catalyst is subsequently introduced to the same carbon black reactor 400 in a step 306. The catalyst is deposited onto the surfaces of the carbon black aggregates 102 that have been formed in situ, in the carbon black reactor 400. The catalyst may be injected through a port in the carbon black reactor 400 downstream of ports used to inject the primary carbon feedstock, for example. A secondary carbon source or feedstock is then also introduced to the same carbon black reactor 400 in a step 308. The secondary carbon source may be injected through a port in the carbon black reactor 400 downstream of ports used to inject the catalyst, for example. The catalyst facilitates the growing of the nanospikes 104 on the surfaces of the carbon black aggregates 102 in situ in the carbon black reactor 400 in a reaction step 310. The growing of the nanospikes 104 occurs prior to a quenching and collection of the nanospike hybrid carbon black product 100 for end use. The gases that contain carbon black aggregates 102 are typically quenched by spraying water into the stream as it passes through a heat exchanger and into a bag filter. The bag filter separates the unagglomerated carbon black aggregates from the by-product tail gas from the combustion process, which comprises mainly nitrogen and water vapor.

The catalyst can include any material suitable for growing the carbon nanospikes 104 on the surfaces of the carbon black aggregates 102 manufactured in the carbon black reactor 400. As particular nonlimiting examples, suitable catalyst may include an iron-containing compound such as iron acetate, ferrocene, ferric citrate. In a most particular example, a suitable catalyst may include $FeCL$. In addition, other transition metals such as nickel and cobalt may also be employed within the scope of the present disclosure. To facilitate an introduction of the catalyst into the carbon black reactor 400, the catalyst is soluble in water, for delivery of the catalyst by injection into the carbon black reactor 400.

In certain embodiments, the catalyst is deposited by injecting the catalyst into the carbon black furnace 400 immediately after carbon black aggregate formation. Concentrations can vary significantly, depending on the application and desired end use. In a particular embodiment, a range of catalyst concentration may be from about 0.5% to about 20% by weight relative to the total weight of the nanospike hybrid carbon black product 100. In a most particular embodiment, the catalyst concentration is about 5% by weight relative to the total weight of the nanospike hybrid carbon black product 100. One of ordinary skill in the art may select suitable concentrations of catalyst to be injected into the carbon black furnace 400, as desired.

Suitable secondary sources of carbon for growth the nanospikes may include gaseous hydrocarbons. It has been found that particularly suitable secondary carbon sources may include ethylene and methane. Other gaseous hydrocarbons such as ethane, propane, butane may also be used. One of ordinary skill in the art may select other suitable sources of carbon as the secondary carbon source or feedstock, as desired.

The typical residence time during which the nanospikes 104 are grown in the reactor is in the millisecond range. It should be understood that the residence time is necessarily limited, since the velocity in the carbon black reactor 400 is fairly high and the temperature rapidly drops off once the reaction is water quenched in the carbon black reactor 500. This effectively stops the growth period of the nanospikes 104 on the surfaces of the carbon black aggregates 102 when the temperature is below a predetermined minimum temperature.

The nanospikes 104 may be grown in the carbon black reactor 400 at temperatures also suitable for the formation of furnace-type carbon black. In a particular embodiment, the nanospikes 104 are grown at a temperature of about 1650° C. Other suitable temperatures for growth of the nanospikes 104 may be selected by a skilled artisan within the scope of the present disclosure.

It should also be appreciated that, for suitable nanospike 104 growth, there is necessarily a hydrogen rich environment in the carbon black reactor 400. In particular, a suitably hydrogen rich environment may includes hydrogen contents in the range of 8-18 mol %. The hydrogen content may be controlled by selection of each of the primary and secondary carbon sources or feedstock. One of ordinary skill in the art may select suitable concentrations of carbon and hydrogen in the step of growing the nanospikes 104, as desired.

With renewed reference to FIG. 4, the carbon black reactor 400 for use with the method 300 of the present disclosure is shown in greater detail. The carbon black reactor 400 is in communication with a source of natural gas 402, a preheated air source 404, and a source of alkali metal additive 406. The reactor 400 receives and internally combusts the natural gas, preheated air and additive to temperatures up to about 1650° C. (3000° F.). At a port downstream from the source of natural gas 402, the preheated air source 404, and the source of alkali metal additive 406, the reactor 400 is in further communication with a source of the primary carbon feedstock 408. The reactor 400 further combusts the primary carbon feedstock 408 received from the source of the primary carbon feedstock 408, for production of the carbon black aggregates 102. The port through which the primary carbon feedstock 408 is provided may be in communication with an atomizing nozzle that atomizes the primary carbon feedstock for delivery to the reactor 400.

At a port downstream from the source of the primary carbon feedstock 408, the reactor 400 is in communication with a nanospike catalyst source 410. The reactor 400 receives the catalyst from the nanospike catalyst source 410 for deposition on the surfaces of the carbon black aggregates 102 in situ, i.e., within the reactor 400. Subsequently, at a port downstream from the nanospike catalyst source 410, the reactor 400 is in communication with a source of secondary carbon feedstock 412. The reactor receives the secondary carbon feedstock from the source of secondary carbon feedstock 412 for growth of the carbon nanospikes 104 on the surfaces of the carbon black aggregates 102 that have been doped with the catalyst. Finally, the reactor 400 is in communication with a quench water source 414 at a port downstream of the source of secondary carbon feedstock 412. The catalyzed reaction causing the growth of the nanospikes 104 is then ceased by a supply of water from the quench water source 414 at this location within the reactor 400, resulting in the formation of the nanospike hybrid carbon black product 100 of the disclosure.

One of ordinary skill in the art may also select other suitable configurations and types of reactors 400 for employment with the method 300 of the present disclosure, and usable for the manufacturing of the nanospike hybrid carbon black product 100, as desired.

The present disclosure also includes a polymer formulation having a quantity of polymer, such as a rubber or a plastic, and a quantity of the nanospike hybrid carbon black product 100. The particles of the nanospike hybrid carbon black product 100 may be substantially evenly distributed throughout the polymer, for example, by a mixing operation prior to an extrusion or molding operation. It should be understood that the substantially even distribution of the nanospike hybrid carbon black product 100 throughout the polymer may be facilitated by a thorough mixing operation, and that the ability to perform such mixing operations is possessed by of one of ordinary skill in the art.

Where the polymer formulation includes rubber, the formulation can be compounded by methods known in the rubber compounding art, such as mixing various sulfur-vulcanizable constituent polymers with various commonly used additive materials as, for example, curing aids such as sulfur, activators, retarders and accelerators, processing additives such as oils, resins, for example, tackifying resins, silicas, plasticizers, fillers, pigments, fatty acid, zinc oxide, waxes, antioxidants and antiozonants, peptizing agents, and reinforcing materials such as, for example, carbon black, and the like. Other suitable additives for rubber formulations may also be used, as desired. Depending on the intended use of the rubber formulation, the common additives are selected and used in conventional amounts.

Other types of formulations and products without polymers such as inks, as a nonlimiting example, are also contemplated as using the nanospike hybrid carbon black product 100, and are likewise within the scope of the present disclosure.

The present disclosure also includes an article comprising the rubber formulation having the nanospike hybrid carbon black product 100. It should be appreciated that the rubber formulation having the nanospike hybrid carbon black product 100 may be extruded, molded, or otherwise formed into a desired shape and cured through the application of at least one of heat and pressure. As a nonlimiting example, the rubber formulation may used in a tire having a component such as a tire tread, sidewall, belt coat, or another component of the tire. Other types of articles including commercial products such as belts and hoses may also be manufactured using the rubber formulation with the nanospike hybrid carbon black product 100, within the scope of the disclosure.

EXPERIMENTAL

Two versions of the nanospike hybrid carbon black product 100 were produced according to the run conditions shown in TABLE 1. Example A was produced with secondary ethylene injection. Example B was produced with secondary methane injection.

TABLE 1

Run conditions used to manufacture the nanospike hybrid carbon black product.

| Conditions | Sample No. | Control A | Example A | Control B | Example B |
|---|---|---|---|---|---|
| Process Air | Air Rate (SCFH) | 14000 | 14000 | 14000 | 14000 |
|  | Air/Gas Ratio | 14 | 14.1 | 14.1 | 14.1 |
| Process Oil | Oil Rate (GPH) | 32.61 | 32.61 | 32.61 | 32.61 |
|  | Oil Pressure (PSI) | 85 | 84 | 86 | 84 |
|  | Air/Oil Ratio (SCF/gal) | 429.32 | 429.32 | 429.32 | 429.32 |
|  | Oil Spray Position | 1 | 1 | 1 | 1 |
|  | Oil Spray Type | ⅛" tubes | ⅛" tubes | ⅛" tubes | ⅛" tubes |
| Quench | Quench Position | 364 | 364 | 364 | 364 |
| Temperatures | Air Temp (° F.) | 608 | 626 | 622 | 625 |
|  | Gas Temp (° F.) | 102.25 | 98.3 | 78.2 | 86.67 |
|  | Quench Temp (° F.) | 686 | 663 | 750 | 742 |
|  | Oil Temp (° F.) | 450 | 450 | 450 | 450 |
| Additive | Additive Rate (cc/min) | 27 | 27 | 27 | 27 |
|  | Additive Concentration (PPM) | 100.371 | 100.37099 | 100.371 | 100.37099 |
| Production | Yield (lb/gal) | 5.8 | 5.8 | 5.8 | 5.8 |
|  | Production Rate (lb/day) | 4539.312 | 4539.312 | 4539.312 | 4539.312 |
| FeCl Position |  |  | FeCl + 79 |  | FeCl + 79 |
| FeCl flow rate. Concentration-65 g/FeCl per 100 cc H2O |  |  | 310 $^{ml}$/min |  | 310 $^{ml}$/min |
| Gas Type Injected |  |  | Ethylene + 104 |  | Methane + 104 |
| Gas Flow Rate |  |  | 1500 scfh |  | 1500 scfh |

The production steps employed in these experimental runs is described as follows:

1) The carbon black reactor was tuned to produce N700 series carbon black. It should be appreciated that the conditions permitting the production of a standard series carbon black such as N700 may be selected by one of ordinary skill in the art of carbon black manufacturing.

Although a N700 series carbon black is used herein for purposes of explanation, it should also be understood that any production methodology for standard or non-standard series carbon black products may also be modified using the methodology described herein, in order to manufacture a nanospike hybrid carbon black product according to the present disclosure.

2) Iron Chloride (FeCl) was injected at a concentration of 5% iron at port +79", a location measured from a beginning of the reactor. The FeCl is a water soluble chemical. High reaction temperature and presence of hydrogen reduces the FeCl to elemental iron. Iron deposited on the surface of carbon black act as a catalyst for further nanospike growth.

3) Ethylene (for Example A) or methane (for Example B) was injected at the rate of 1500 scfh at the ports located at +104", a location measured from a beginning of the reactor.

Experiments have shown that ethylene may be more effective for nanospike growth as compared to other gaseous carbon sources like methane.

Testing and Analysis:

The obtained material was initially analyzed for surface area and structure. The nitrogen surface area (N2SA) was measured to be about 32.3 for the controls, 29.4 for Example A, and 31.6 for Example B.

Figure 2:

TEM pictures (FIGS. 1-2) were obtained, and confirmed the presence of nanospikes on the surfaces of the carbon black in Examples A and B. FIGS. 1-2 also confirmed the absence of nanotubes. This imagery indicates that no nanotubes are produced in the manufacturing of the nanospike hybrid carbon black product 100 according to the present disclosure.

Testing of rubber compounds was also performed in a formulation specifically designed for seals application, as shown in TABLE 2.

TABLE 2

A rubber formulation used for testing the nanospike hybrid carbon black according to the present disclosure.

| Ingredient | PHR |
|---|---|
| EPDM (Royalene 539) | 100 |
| Carbon Black (Controls and Examples A and B) | 90 |
| Parafiinic Oil (Sunpar 2280) | 75 |
| Zinc Oxide | 5 |
| Stearic Acid | 1 |

TABLE 2-continued

A rubber formulation used for testing the nanospike hybrid carbon black according to the present disclosure.

| Ingredient | PHR |
|---|---|
| Sulfur | 1.5 |
| MBT | 2.75 |

The testing of the nanospike hybrid carbon black (Examples A and B) in the rubber formulation of TABLE 2 was performed in comparison to controls of N650 grade carbon black and SR711 grade carbon black in the rubber formulation of TABLE 2. SR711 is an unpelletized N762 grade carbon black marketed by the Applicant for extruded goods, belts and hoses, and molded goods, and which is also used in plastic color concentrates.

The below TABLE 3 shows rubber properties obtained for rubber compounds, which were prepared according to the rubber formulation of TABLE 2.

TABLE 3

Rubber Testing Results.

| Description | Control (N650) | Example A (Ethylene) | Example B (Methane) | Control (SR711) |
|---|---|---|---|---|
| Stress-Strain | | | | |
| 100% Mod, Mpa | 2.6 | 1.8 | 1.9 | 1.9 |
| 200% Mod, Mpa | 5.4 | 3.2 | 3.5 | 3.5 |
| 300% Mod, Mpa | 7.9 | 4.5 | 5.2 | 5.3 |
| Tensile, Mpa | 12 | 16.2 | 13.3 | 14.9 |
| Elongation, % | 472 | 665 | 604 | 610 |
| Durometer | 66 | 62 | 63 | 63 |
| Goodyear-Healy Rebound | 59.2 | 66 | 64.6 | 64.7 |
| MDR @160 C. | | | | |
| ML, dNm | 1.4 | 1.1 | 1.2 | 1.1 |
| MH. dNm | 11.3 | 11.7 | 11.8 | 10.3 |
| ts1, min | 3.2 | 3.3 | 2.4 | 3 |
| t'50, min | 13.5 | 11 | 9.3 | 12.2 |
| t'90, min | 42.4 | 32 | 30.3 | 41.4 |
| ML1 + 4 @100° C. | 54.6 | 44.6 | 45.8 | 43.3 |
| Rheometrics SS @ 30° C. | | | | |
| G' max (.1%), MPa | 4.3 | 2.58 | 2.68 | 2.52 |
| G" max (2%), MPa | 0.53 | 0.29 | 0.31 | 0.25 |
| Tan S max (6-7%) | 0.17 | 0.14 | 0.14 | 0.12 |
| Strebbler Peel Test | | | | |
| Tc [kg/mm] | 2.5 | 2.1 | 2.4 | 2.8 |
| Angle Abrasion (à 121/2° 2800 Revolutions | | | | |
| % vs. N650 Control | 100 | 49 | 57 | 75 |
| Avg Weight Loss | 8.58 | 17.38 | 14.96 | 11.46 |
| Phillips Dispersion | 5 | 7 | 7 | 6 |

The below TABLE 4 also shows compression set data obtained for rubber compounds prepared according to the rubber formulation of TABLE 2.

TABLE 4

Compression Set Testing Results.

| Description | Control (N650) | Example A (Ethylene) | Example B (Methane) | Control (SR711) |
|---|---|---|---|---|
| Compression Set, (ASTM D395, Method B), 25% Deflection (0.375" Spacer) @ 70° C./22 Hours | | | | |
| Original Thickness, in. Avg | 0.499 | 0.496 | 0.497 | 0.493 |
| Final Thickness, in. Avg | 0.47 | 0.473 | 0.476 | 0.467 |
| % Original Deflection Avg | 23.8 | 19.6 | 17.2 | 22.2 |
| Compression Set, (ASTM D395, Method B), 25% Deflection (0.375" Spacer) @ 100° C./22 Hours | | | | |
| Original Thickness, in. Avg | 0.495 | 0.494 | 0.497 | 0.495 |
| Final Thickness, in. Avg | 0.425 | 0.433 | 0.442 | 0.425 |
| % Original Deflection Avg | 58.2 | 51.3 | 45.2 | 57.9 |
| Compression Set, (ASTM D395, Method B), 25% Deflection (0.375" Spacer) @ 200° C./22 Hours | | | | |
| Original Thickness, in. Avg | 0.498 | 0.496 | 0.497 | 0.495 |
| Final Thickness, in. Avg | 0.392 | 0.398 | 0.401 | 0.396 |
| % Original Deflection Avg | 86.1 | 81.4 | 78.5 | 82.9 |

Observations and Conclusions:

The nanospike hybrid carbon black product 100 of the present disclosure has unique properties that are not otherwise available from any known carbon black products.

The carbon black surface was modified by deposition of iron catalyst and small growth of carbonaceous material. No visible nanotubes are produced in this process. As expected and confirmed by TEM pictures (see FIGS. 1 and 2), the "spikes like growth" was initiated in both cases, i.e., Example A for ethylene- and Example B for methane-secondary injections.

Compression set of the cured rubber compounds with the nanospike hybrid carbon black product 100 of Examples A and B was surprisingly observed to be superior to the controls, in every EPDM formulation studied and at every temperature. Subsequent testing of the nanospike hybrid carbon black product in comparison to a benchmark N990 has also confirmed this superior compression set performance. The lower temperatures exhibited even more dramatic improvement.

Also, samples produced with the secondary methane injection (Example B) performed better in compression set compared to sample produced with secondary ethylene injection (Example A). Without being bound by any particular theory, this may be attributed to the difference in the amount of catalyst deposited on the surface of the carbon black. TGA testing (not shown) was performed and revealed that Example A produced with secondary ethylene injection had 2.2% iron deposited, whereas the Example B produced with the secondary methane injection had 5% of iron deposited, during the manufacturing process.

Advantageously, a dispersion of nanospike hybrid carbon black product 100 was superior in every case studied, as shown by improved Phillips Dispersion results for the rubber compounds with Examples A and B relative to the controls. This result has also been observed in comparison to benchmark N990 grade carbon black in other testing.

It is strongly reiterated that the nanospike hybrid carbon black product 100 does not contain any nanotubes. The surface of the nanospike hybrid carbon black product 100 is modified by the localized growth of carbonaceous material on the top of iron catalyst deposited in situ on the carbon black surface. These growths (referred to hereinabove as "nanospikes") look like the spikes or nodules confirmed by TEM observations, and are not nanotubes as understood in the art.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for manufacturing a nanospike hybrid carbon black, the method comprising the steps of:
    injecting a primary carbon feedstock into a carbon black reactor at a first rate through a first port of the carbon black reactor, wherein the primary carbon feedstock is an aromatic oil;
    combusting the primary carbon feedstock at a predetermined temperature in the carbon black reactor to form carbon black aggregates, wherein the combusting of the primary carbon feedstock provides a hydrogen rich environment with a hydrogen content in a range of 8 to 18 mole percent within the carbon black rector;
    injecting a catalyst into the reactor at a second rate through a second port of the carbon black reactor to deposit the catalyst on surfaces of the carbon black aggregates;
    injecting a secondary carbon feedstock into the carbon black reactor at a third rate through a third port of the carbon black reactor after the catalyst has been deposited onto the surfaces of the carbon black aggregates, the second port disposed between the first port and the third port, and the third rate of injection different from the first rate of injection, wherein the secondary carbon feedstock is a gaseous hydrocarbon and different from the primary carbon feedstock, and wherein the third rate of injection, the hydrogen content within the carbon black reactor, and a reaction temperature in the carbon black reactor at the third port are sufficient to form carbon nanospikes instead of amorphous carbon black with the secondary carbon feedstock on the carbon black aggregates, the reaction temperature for forming the carbon nanospikes different from the predetermined temperature for forming the carbon black aggregates;
    reacting the secondary carbon feedstock with the catalyst for a residence time sufficient to grow carbon nanospikes on the surfaces of the carbon black aggregates only where the catalyst is deposited, wherein the residence time is long enough to permit the carbon nanospiked to grow to a length of between 5 nm and 100 nm, and is not long enough to permit the carbon nanospikes to grow to a length grater than 100 nm on the surface of the carbon black aggregates; and
    quenching the reacting of the secondary carbon feedstock with a catalyst by water, upon completion of the residence time, to cease growth of the carbon nanospikes.

2. The method of claim 1, wherein the catalyst is an iron-containing compound.

3. The method of claim 1, wherein the catalyst is supplied to the carbon black reactor in an amount sufficient to provide a concentration from about 0.5% to about 20% by weight relative to the total weight of the nanospike hybrid carbon black product.

4. The method of claim 1, wherein the second carbon feedstock is on of methane and ethylene.

5. The method of claim 4, wherein the second carbon feedstock is ethylene.

* * * * *